United States Patent [19]
Schwendemann et al.

[11] Patent Number: 5,446,884
[45] Date of Patent: Aug. 29, 1995

[54] DATABASE RECOVERY APPARATUS AND METHOD

[75] Inventors: Walter Schwendemann; Peter C. Wang, both of Austin, Tex.

[73] Assignee: International Business Machines Corporation, Armonk, N.Y.

[21] Appl. No.: 835,635

[22] Filed: Feb. 13, 1992

[51] Int. Cl.⁶ .............................................. G06F 17/30
[52] U.S. Cl. ............................. 395/600; 364/DIG. 1; 364/222.81
[58] Field of Search ......................................... 395/600

[56] References Cited

U.S. PATENT DOCUMENTS

| | | | |
|---|---|---|---|
| 4,592,086 | 5/1986 | Watari et al. | 381/43 |
| 4,945,474 | 7/1990 | Elliott et al. | 395/600 |
| 5,043,866 | 8/1991 | Myre et al. | 395/600 |
| 5,043,871 | 8/1991 | Nishigaki et al. | 395/600 |
| 5,287,496 | 2/1994 | Chen et al. | 395/600 |

OTHER PUBLICATIONS

Gray, J, "Notes on Data Base Operating Systems", 1977, pp. 394, 460–463.
IBM Technical Disclosure Bulletin, Backware Restore From Incremental Backup vol. 34 No. 4A, Sep. 1991, pp. 24, 25 and 26.

*Primary Examiner*—Thomas G. Black
*Assistant Examiner*—John C. Loomis
*Attorney, Agent, or Firm*—Mark S. Walker; L. Keith Stephens

[57] ABSTRACT

A method, system and program for efficiently archiving and recovering a database is disclosed. The archiving process utilizes a reverse chronological order for the tape to facilitate efficient restoration of the database. The recovery processing utilizes a linked list to track record updates and avoid updating the same record with anything but the most current information.

9 Claims, 4 Drawing Sheets

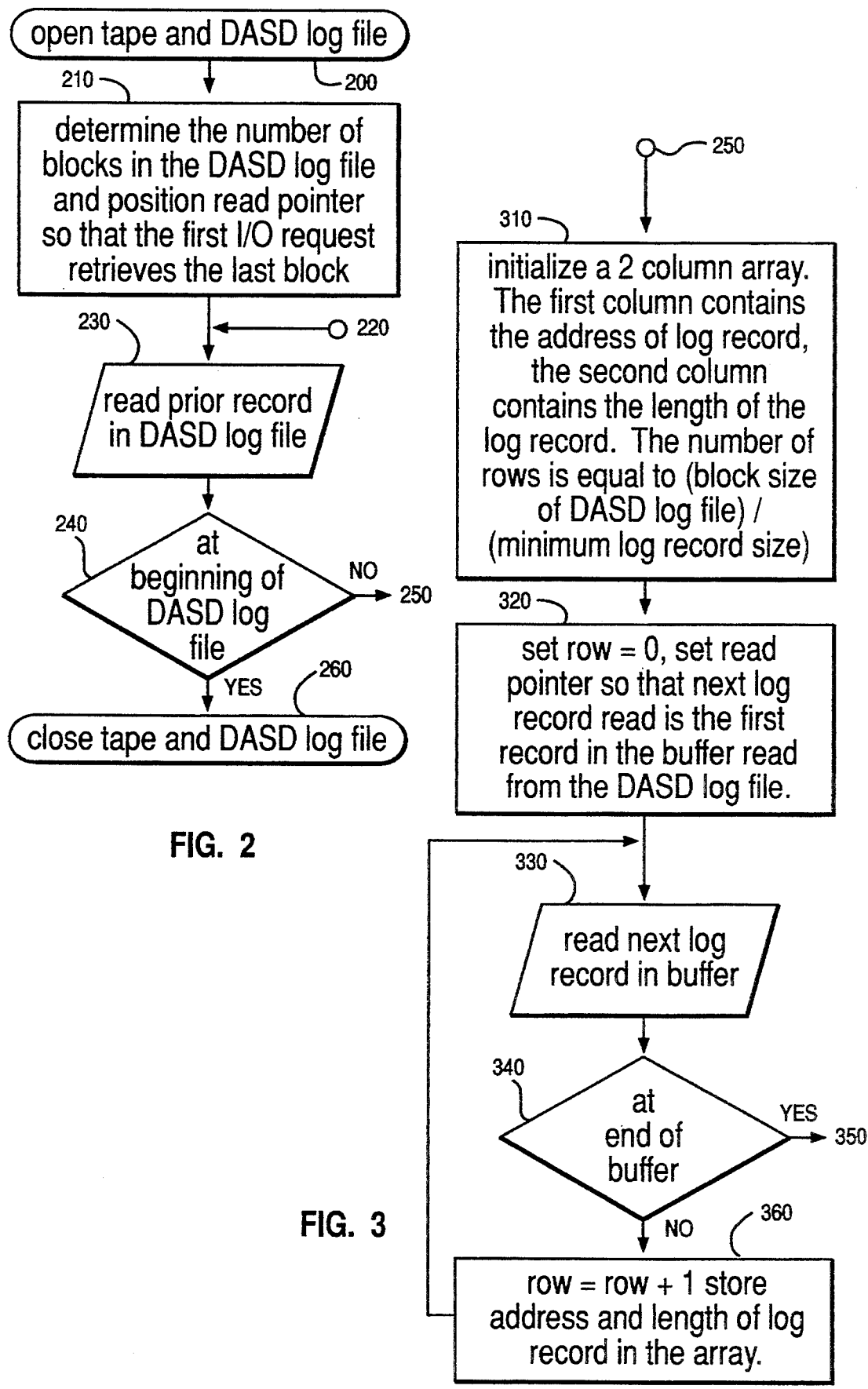

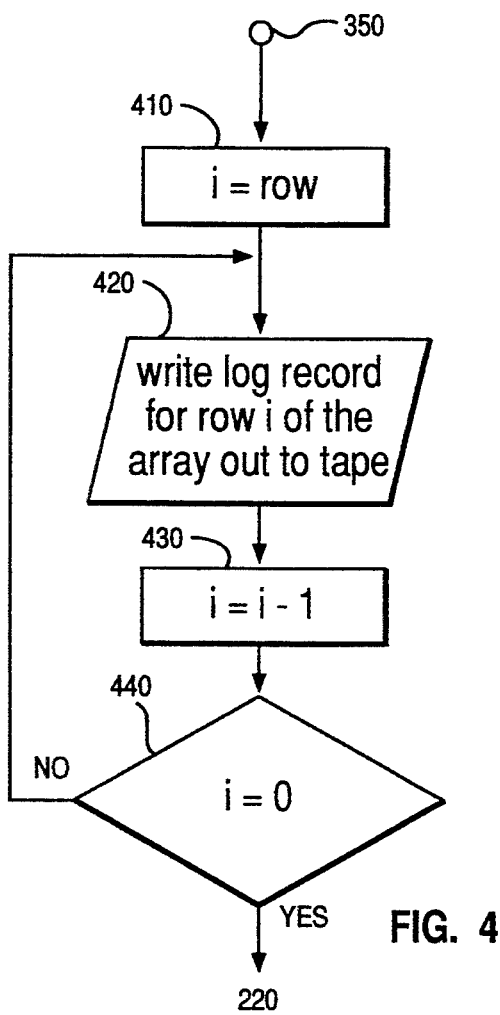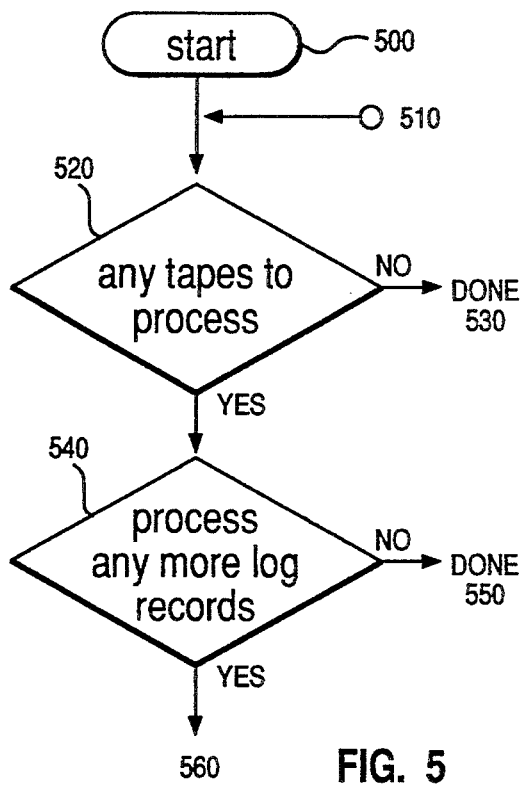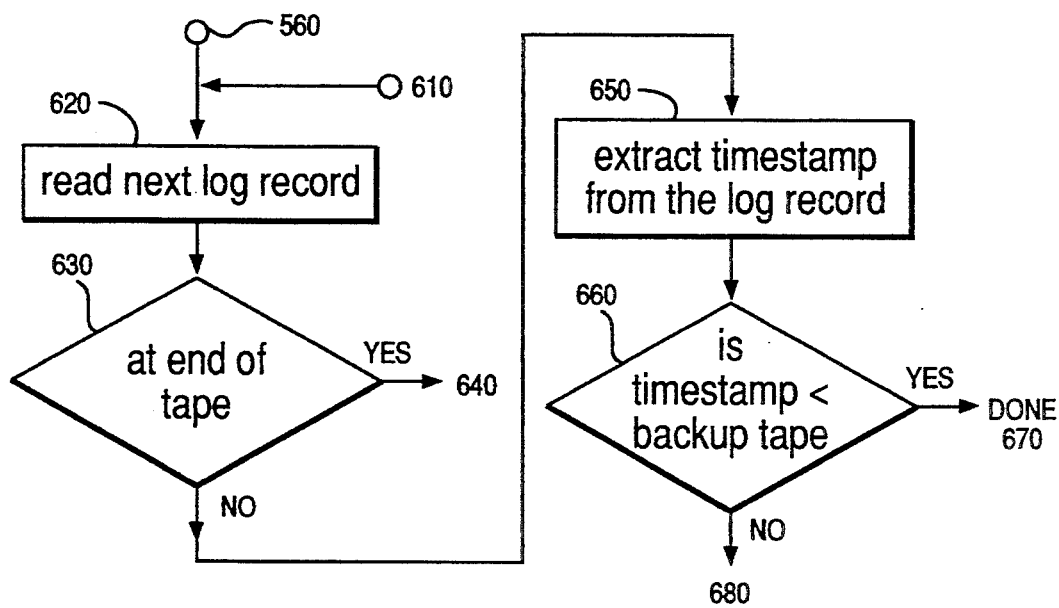
FIG. 4
FIG. 5
FIG. 6

DATABASE RECOVERY APPARATUS AND METHOD

FIELD OF THE INVENTION

This invention generally relates to improvements in database applications and more particularly to recovering a database employing an archival tape created in reverse chronological order.

BACKGROUND OF THE INVENTION

Databases have become the subject of significant recent interest, not only because of the increasing volume of data being stored and retrieved by computerized databases, but also by virtue of the data relationships which can be established during the storage and retrieval processes. Most of the interest in databases has concerned user demands for an improved ergonomic interface.

One aspect of improved ergonomics is the ability to recover a database in an efficient manner when a computer failure occurs. In the past, entire backups of a database were often used to restore a database from a particular point in time. However, as more and more information was stored in a database, and the information changed more often, archival of the entire database became less desirable and incremental changes were used to recover a database. An example of this approach to database recovery is shown in U.S. Pat. No. 4,592,086 and IBM TDB no. 4a, Sept. 1991, pp. 24–26, entitled, BACKWARD RESTORE FROM INCREMENTAL BACKUP. The article and patent describe an incremental backup methodology and how a database can be restored from incremental backup tapes.

SUMMARY OF THE INVENTION

Accordingly, it is a primary object of the present invention to provide an improved system and method for recovering a database.

These and other objects of the present invention are accomplished by the operation of an algorithm in the memory of a processor. The algorithm is used to create an archival log tape by initially writing information to a disk with a record identifier. Then the information is transferred from the disk to an archival tape by starting with the last block in the disk file and writing consecutive records from the archival tape until all of the entries in the disk file have been transferred. Then, the archival tape and disk file are closed to facilitate reuse of the resources.

When recovery of the database is necessary, the archival tape or tapes are opened in a Last-In-First-Out (LIFO) order (new to old). Then, for each tape, the log records are processed by checking the timestamp to assure that the timestamp is not less than the timestamp of the last backup tape. If the timestamp is less, then the recovery is complete and the recovery has been completed. Next, a hash is performed on the record identifier of the log record to collapse a range of record identifiers into a single value. The hashed value is used as an index into an array of indexes to a linked list of record identifiers that have already been processed. The array has null entries for all record identifiers that have not been processed and a pointer to any record identifiers that have been processed.

If the hashed value is indexed to an entry with no value, then the database entry is updated with the information from the archival tape and the linked list is updated with a pointer to the record identifier. However, if the entry has a value, then the linked list is traversed to determine if a record identifier has already been processed. If no record identifier has been processed, then the database record is updated, and an entry is added to the linked list for the particular record identifier. If an entry for the record identifier is found, then the log record is discarded and the process is repeated for the next log record.

BRIEF DESCRIPTION OF THE DRAWINGS

FIG. 2 is a flowchart depicting the detailed logic for creating an archival tape of a database in accordance with the subject invention;

FIG. 3 is a flowchart depicting the detailed logic for creating an archival tape of a database in accordance with the subject invention;

FIG. 4 is a flowchart depicting the detailed logic for creating an archival tape in reverse chronological sequence in accordance with the subject invention;

FIG. 5 is a flowchart depicting the detailed logic for restoring a database from an archival tape in accordance with the subject invention;

FIG. 6 is a flowchart depicting the detailed logic for restoring a database from an archival tape in accordance with the subject invention.

DETAILED DESCRIPTION OF THE INVENTION

Figure 1:
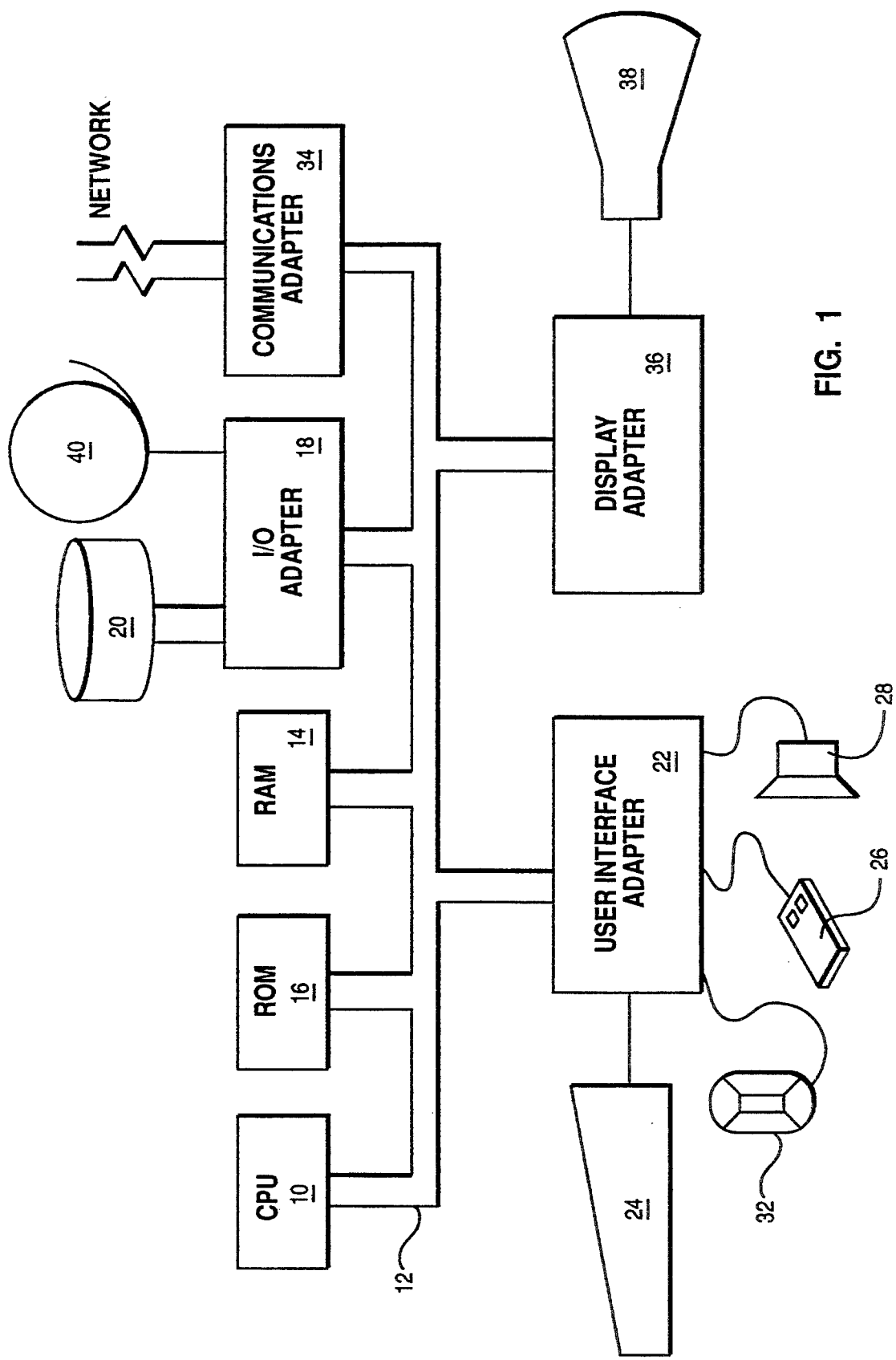
FIG. 1 is a block diagram of a personal computer system in accordance with the subject invention.

The invention is preferably practiced in the context of a relational database such as is available with Database Manager in the Extended Services (TM) software program available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 and tape drives 40 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

The workstation has resident thereon the OS/2 base operating system and the aforementioned Database Manager relational database program. Currently, most programs that recover a database from a set of log tapes process the tapes in chronological order. The image in the log tape record replaces the image in the database. This approach is not efficient if the majority of the database is static and only a few records in the database are updated very frequently. The invention creates archival log tapes in reverse chronological order and applies the archival log tapes to recover a database. The processing reduces the time necessary for recovering a database and bringing it back online.

Creation of an archival log tape is accomplished in two steps by first accumulating log entries on a Direct Access Storage Device (DASD) and then transferring the information to tape. A disk file accumulates log files as they are created. Then, starting with the last record in the log file, a two column array is initialized. The first column contains the address of the first log record in the buffer, and the second column contains the length of the log record. The maximum number of rows in the array is equal to the Buffer size divided by the minimum log record size. This size also corresponds to the size of the log record header. Then, a row counter is initialized and for all log records in the buffer, the row counter is incremented and the address and length of the log record is stored in the array entry corresponding to the row counter, and the next log record is processed until all the log records have been processed. The information in the arrays is then written to tape starting with the last row counter entry, and ending with the first row counter entry. Then, the tape and log file are closed.

To recover from an archival log tape, the backup database image is first restored from its last checkpoint. Then, the archival tapes are processed from the newest archive tape to the oldest archival tape. Each tape has all of the log records read into memory. Subsequently, the time stamp of the log record is checked to determine if the timestamp is less than the timestamp of the last backup tape. If the timestamp is less, then the recovery is complete. If the timestamp is not less, then a hash is performed on the record identifier of the log entry. The hashing function collapses a range of record identifiers into one value. The hashed value is used as an index into an array. The contents of the index is either a null or a pointer to a linked list of record identifiers that have already been processed which is termed a collision.

If there is no collision, then the database record is updated and the linked list updated. If there is a collision, then the linked list is traversed to determine if the record identifier has already been processed employing a more current record. If so, then the log record is discarded. If no processing has occurred, then the database is updated and an entry is added for this record identifier to the linked list. Then, the next log file is processed until there are no more log tapes.

Another alternative would be to process any log files that had not been archived first. Then, before any of the archived log tapes are processed, the log files would be transformed into an array of log records in reverse chronological order, and the array would be used to process the log records in the same way as records would be processed from a tape.

DETAILED LOGIC

FIG. 2 is a flowchart depicting the detailed logic for creating an archival tape of a database in accordance with the subject invention. Processing commences at function block 200 where the archival tape and the DASD log file are opened. Then, at function block 210, the number of blocks in the DASD log file is calculated and the read pointer is positioned so that the first Input-/Output (I/O) request retrieves the last block. The prior record in the DASD log file is read at input block 230. Then, a test is performed at decision block 240 to determine if the beginning of the DASD log file has been reached. If the beginning is not detected, then a block from the DASD log file is processed as detailed in FIG. 3. If the beginning has been reached, the tape and DASD log file is closed at function block 260.

FIG. 3 is a flowchart detailing the processing of a block from the DASD log file in accordance with the subject invention. Processing commences when control flows from FIG. 2 at label 250 to FIG. 3 label 250 which immediately transfers processing to function block 310 where a two column array is initialized. The first column contains the address of the log record and the second column contains the length of the log record. Then, the row counter is initialized to zero as shown in function block 320 and control passes into a loop. At input block 330, the next log record is read into the buffer and a test is performed at decision block 340 to determine if the end of buffer has been reached. If the end of buffer has been reached, then control passes to FIG. 4 where log records are written to tape in reverse chronological sequence. If the end of buffer has not been detected, then the row counter is incremented and the address of log record is stored in function block 360.

FIG. 4 is a flowchart depicting the detailed logic for creating an archival tape in reverse chronological sequence in accordance with the subject invention. Processing commences at label 350 where control is passed from label 350 of FIG. 3. First, an index is initialized with the current row counter in function block 410. Then, a log record of row index of the array is written to tape at output block 420. Then, the index is decremented at function block 430 and a test is performed at decision block 440 to determine if the index is equal to zero. If the index is not equal to zero, then control passes back to output block 420 to write the next log record to tape. If the index is equal to zero, then control passes back from label 220 to label 220 of FIG. 2 to process another DASD log file.

FIG. 5 is a flowchart depicting the detailed logic for restoring a database from an archival tape in accordance with the subject invention. Processing commences at label 500 and immediately flows into a test at decision block 520 to determine if any tapes are available for processing. If no tapes are available, then processing is complete at terminal 530. If tapes are available, then another test is performed at decision block 540. If no more log records are available for processing, then processing is complete as indicated at terminal 550. If there are more log records, then processing is passed to FIG. 6 for processing of an archival tape.

FIG. 6 is a flowchart depicting the detailed logic for restoring a database from an archival tape in accordance with the subject invention. Control commences at function block 620 where control was passed via label 560 from label 560 of FIG. 5 and begins with the next log record being read. Then, a test is performed at decision block 630 to determine if the end of tape has been reached. If the end of tape has been reached, then control passes to label 510 of FIG. 5 to process then next tape. If the end of tape has not been reached, then the timestamp is extracted from the log record at function block 650 and another test is performed at decision block 660 to determine if the time stamp is greater than the backup tape. If the time stamp is greater than the backup tape, then processing is complete as shown at terminal 670. However, if the time stamp is not greater, then control passes to FIG. 7 to apply log records to the database.

Figure 7:
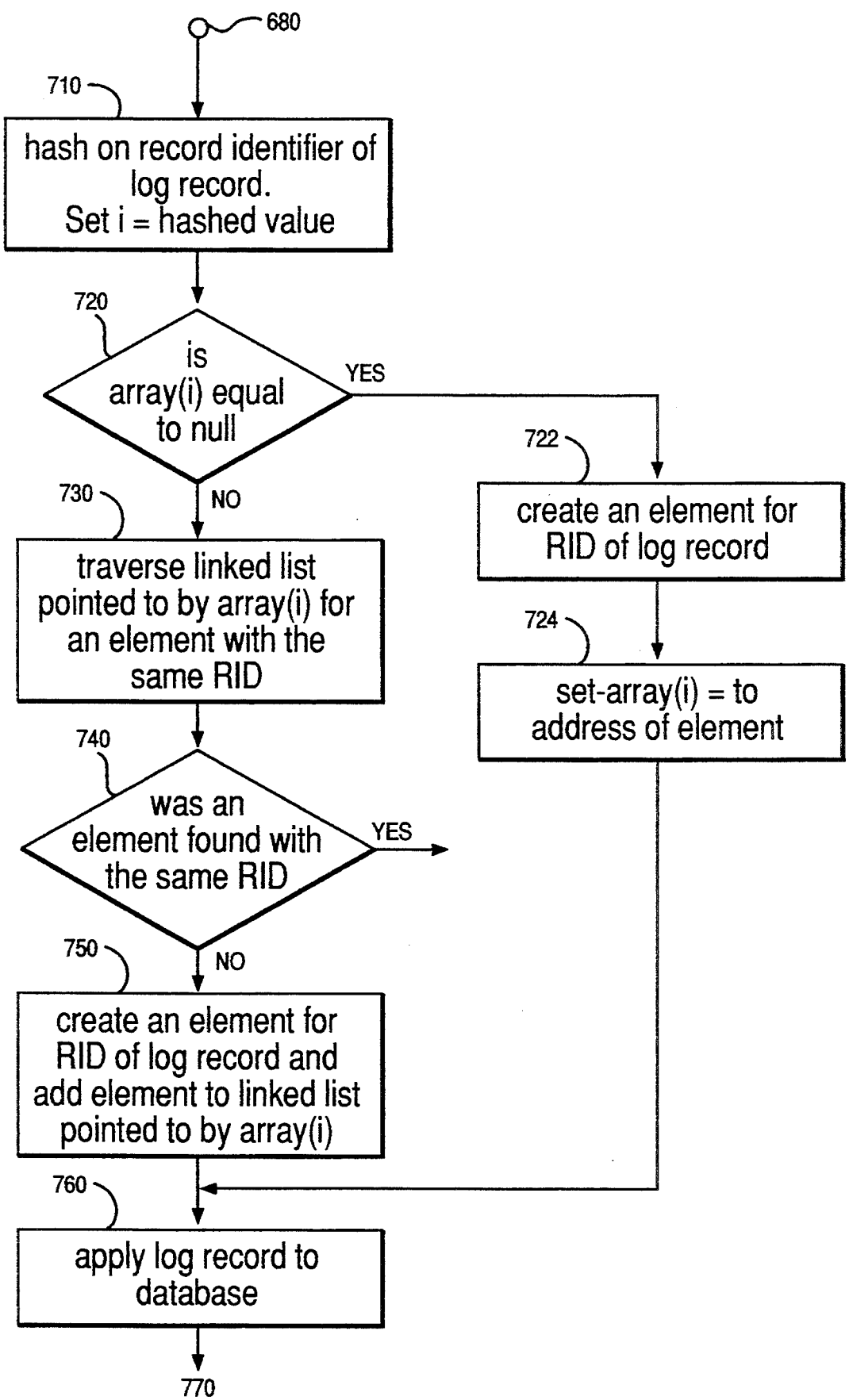
FIG. 7 is a flowchart depicting the detailed logic for restoring a database from an archival tape in accordance with the subject invention.

FIG. 7 is a flowchart showing the detailed logic associated with applying log records to a database in accordance with the subject invention. An array of "n" elements is maintained to determine if a log record for an element of the database has already been processed. A hashing function is applied to the log record's record identifier to obtain an index in the array. The array has the following characteristics. Array(i)=null if a log record for this index has never been processed. Array(i)<>null, then this index points to a linked list of record identifiers that have already been processed.

Processing commences when control is passed from label 680 of FIG. 6 through label 680 of FIG. 7 to function block 710 where a hash is performed on record identifier of log record and the index i is set to the hashed value. Then, a test is performed in decision block 720 to determine if array(i) is equal to a null value. If it is null, then an element in the array is created for the record identifier at function block 772, the address of the element is placed in the array at function block 724, and control passes to function block 760.

If the array value is not equal to null, then the linked list is traversed for an element with the same record identifier in function block 730 and a test is performed at decision block 740 to determine if an element was found. If an element was found with the same record id, then control passes to label 610 to process the next record. If no element match was identified, then an element is created for the record id of the log record and an element is added to the linked list pointed to by array(i). Finally, the log record is applied to the database at function block 760 and control is passed to label 610 of FIG. 6 to process the next entry.

PSEUDO-CODE IN ACCORDANCE WITH THE DETAILED LOGIC

CREATE ARCHIVAL LOG TAPE
  a log file exists on DASD
  the DASD log file is "n" number of
  fixed blocks. Each block consists of
  "x" variable length log records.
PROCESS DASD LOG FILE
  Assumptions:
    log records are written to a "buffer".
    When the buffer is full the contents of
    the buffer is written to tape.
    the number of log records within the
    buffer is known.
    the address of last log record that was
    written is known.
    the structure of the log record is:
    structure log_record {
      int length;
      int logical_sequence_number;
      /* time record was created */
      int record_identifier;
      int before_image_len;
      char before_image;
      int after_image_len;
      char after_image;
    }
MAIN FUNCTION FOR CREATING ARCHIVAL LOG TAPE
  /* global variables */
  int tape_fd, log_fd;
  /* main function */
  void log_to_tape( ) {
    int read_rc, rc;
    char *log_rec
    char log_buffer(4096);
    /* open tape */
    tape_fd = open(tape device);
    if (tape_fd != −1) {
      /* if tape was opened successfully,
      open log file */
      log_fd = open(log DASD file);
      if (log_fd == −1) {

PSEUDO-CODE IN ACCORDANCE WITH THE DETAILED LOGIC

/* log file could not be opened
        */
          write("error message that log
          file could not be opened");
          return;
        }
      }
      else {
        write("error message that tape could
        not be opened");
        return;
      }
      /* position "read", to the end of the file
      */
        lseek(log_fd,0,SEEK_END);
        /* read log file until beginning of file
      has been reached */
        for(rc = lseek(log_fd,−4096,SEEK_CUR);
        rc >= 0; rc = lseek(log_fd,_4096,SEEK_CUR))
        {
          /* read in a page (i.e. 4096 bytes) */
        read_rc = read(log_fd,log_buffer,4096);
          if (read_rc != 4096) {
      /* I/O error has occurred, close files and return
      */
          close(log_fd); close(tape_fd);
          write("I/O error has occurred
          while reading log file");
          return;
        }
        /* process block */
        /*See "Process a block from the
        DASD log file", on page 4 */
        process_block(log_buffer);
      }
      /* finished reading log file. Close log
      and tape files */
      close(tape_fd); close(log_fd);
    }
PROCESS A BLOCK FROM THE DASD LOG FILE
  void process_block(char *log_buffer) {
  int row;
  int nbr_rec = 0;
  int log_rec_len(4096);
  char *log_rec(4096);
  struct log_record *rec;
    /* initialize arrays */
    for(row = 0; row < 4096; row++) {
      log_rec(row) = NULL;
      log_rec_len(row) = 0;
    }
    /* address of 1st log record */
    rec = (struct log_record *) log_buffer;
    /* process log records in buffer */
    for(row = 0; rec->length > 0; (char *)
  rec += rec->length) {
  /* store address and length of log record */
      log_rec[row] = (char *) rec;
      log_rec_len[row] = rec->length;
      /* increment row number */
      row++;
    }
    /* write log records to tape */
    /* See "Write log records to tape in reverse
    chronological sequence" */
      write_to_tape(row, log_buffer, log_rec,
    log_rec_len);
  }
WRITE LOG RECORDS TO TAPE IN REVERSE CHRONOLOGICAL SEQUENCE
  void write_to_tape(int row, char *log_rec[ ],
  int log_rec_len[ ]) {
    int i, rc;
      for (i = row; i >= 0; i--) {
        /* write log record to tape */
        rc = write(tape_fd, log_rec(i),
        log_rec_len(i));
    /* if an error occurred, close files and exit
    program */

PSEUDO-CODE IN ACCORDANCE WITH THE DETAILED LOGIC

```
            if ( rc == -1 ) {
                write("error occurred while
                writing to tape");
                close(tape_fd); close(log_fd);
                exit( );
            }
        }
    }
}
```

RESTORING DATABASE FROM ARCHIVAL LOG TAPES

Backup database image has been restored
all archival log tapes are available.

PROCESS ALL ARCHIVAL LOG TAPES

```
    /* global variables */
    int tape_fd;
    int backup_time; /* timestamp of
backup tape */
    tyepdef struct hash_entry {
        int rid;
        void *next;
    } HASH_ENTRY;
    struct HASH_ENTRY *hash_table[1024];
    /* main function */
    void log_restore( ) {
        int done = 0;
        char answer(30);
    /* loop until all log records have been processed
*/
        for( ; done == 0 ; ) {
            write("mount tape, hit enter when
            ready or "NO" if there are no more
            tapes"),
            read(STDIN,answer,30)
            if (0 == strcmP("NO",answer,))
                return;
            tape_fd = open(tape);
            /* check for error opening tape */
            if (tape_fd == -1) {
                write("error opening tape");
                return;
            }
            /* See "Process archival log tape" */
            done = process log tape( );
            close(tape_fd);
        }
    }
```

PROCESS ARCHIVAL LOG TAPE

```
    int process_log_tape( ) {
    int rc, length;
    int all_done = 0;
    struct log_record rec;
        /* loop forever */
        for(;;) {
    /* read in the first 4 bytes of log record (i.e.
        length) */
            rc = read(tape_fd, &rec.length, 4);
            /* check for I/O error or EOF*/
            if ((rc == -1) || (rc != 4)) {
                /* end of tape */
                if ( rc == EOF )
                    break;
                write("I/O occurred while
            reading log tape");
                all_done = 1;
                break;
            }
            /* check for a "zero" length log
            record (same as "end-of_file") */
            if (rec.length == 0)
                break;
    /* now read in the rest of the record */
            rc = read(tape_fd,
            &rec.logical_sequence_number,rec.length
            - 4);
            /* check for I/O error */
            if ( rc != (rec.length - 4)) {
                write("I/O occurred while
            reading log tape");
                all_done = 1;
```

PSEUDO-CODE IN ACCORDANCE WITH THE DETAILED LOGIC

```
            break;
        }
        /* check LSN (timestamp) */
        if (rec.logical_sequence_number <=
backup_time) {
            all_done = 1;
            break;
        }
    /* See "Apply log record to database" */
        apply_log_rec(&rec);
    }
    return(all_done);
}
```

APPLY LOG RECORD TO DATABASE

An array of "n" elements is maintained to
determine if a log record for an element of the
database has already been processed. A hashing
function is applied to the log record's RID
(record identifier) to obtain the index in
the array.
The array has the following characteristics:
  array(i) = null. A log record for this index
  has never been processed.
  array(i) != null. This index points to a
  linked list of RID's that have already been
  processed.

```
void apply_log_rec(struct log_record *rec) {
    int index, hashval, token, process_rec;
    /* Compute the hash value */
    token = rec->record_identifier;
    for ( hashval = 0 ; token != 0 ; token =
        token / 10 )
            hashval = (token % 10) + 61 *
        hashval;
    index = hashval % 1024;
    if (hash_table[index] == NULL) {
/* See "Create a collision entry for log record"
*/
        create_add_entry( index,
        rec->record_identifier);
            process_rec = 1;
    }
    else
/* See "Traverse a collision chain looking for a
    match on rid" */
        process_rec = find_entry(index,
        rec->record_identifier);
        if (process_rec == 1) {
            call database function that applies
            log record to database
        }
}
```

CREATE A COLLISION ENTRY FOR LOG RECORD

```
    void create_add_entry(int index, int
        record_identifier) {
    int rc;
    HASH_ENTRY *new_entry;
        /* get storage for a new entry */
        new_entry = malloc(sizeof(HASH_ENTRY));
        new_entry->rid = record_identifier;
        new_entry->next = hash_table[index];
        /* add entry to head of list */
        hash_table[index] = new_entry;
}
```

TRAVERSE A COLLISION CHAIN LOOKING FOR A MATCH ON RID

```
    int find_entry(int index, int
        record_identifier);
    int process_rec;
    HASH_ENTRY *entry;
        /* try and find an entry with the same
        "rid" */
        for(entry = hash_table[index]; entry !=
        NULL; entry = entry->next) {
            /* found matching red */
            if (entry->rid == record_identifier)
                break;
        }
        /* found a matching rid */
```

| PSEUDO-CODE IN ACCORDANCE WITH THE DETAILED LOGIC |
| --- |
| ```
if (entry != NULL)
    process_rec = 0;
else {
    /* See "Create a collision entry for
    log record" */
    create_add_entry(index,
record_identifier);
    process_rec = 1;
}
return(process_rec);
``` |

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method for recovering a database with one or more records to a previous state at a particular time, comprising the steps of:
  (a) archiving one or more changed records in the database since said particular time, said one or more changed records archived in reverse chronological order, wherein said step of archiving one or more changed records further comprises the steps of:
    sorting said one or more changed records in said reverse chronological order; and
    archiving said sorted one or more changed records onto a tape storage device in said reverse chronological order; and;
  (b) recovering the database by applying the one or more changed records archived in said tape storage device in said reverse chronological order so that only the archived changed record occuring nearest in time to said particular time is applied to said database.

2. A method as recited in claim 1, wherein the database is relational.

3. A method as recited in claim 1, including the step of storing the database on a disk.

4. The method as recited in claim 1, wherein said step of archiving one or more changed records in the database since said particular time further comprises the step of storing said one or more changed records in a direct access storage device;
  wherein said step of sorting said one or more changed records further comprises the steps of:
    creating a two column array in said direct access storage device, wherein each row of said two column array corresponds to one of said one or more changed records stored in said direct access storage device, wherein a particular row contains an address and a length of a particular corresponding changed record; and
    organizing said created two column array into said reverse chronological order, wherein said step of archiving said sorted one or more changed records onto said tape storage device further comprises the step of:
  transferring said one or more changed records from said direct access storage device to said tape storage device in accordance with said created two column array organized in said reverse chronological order.

5. An apparatus for recovering a database with one or more records to a previous state at a particular time, comprising:
  (a) means for archiving one or more changed records in the database since said particular time, said one or more changed records archived in reverse chronological order, wherein said means for archiving one or more changed records further comprises:
    means for sorting said one or more changed records in said reverse chronological order; and
    means for archiving said sorted one or more changed records onto a tape storage device in said reverse chronological order; and
  (b) means for recovering the database by applying the one or more changed records archived in said tape storage device in said reverse chronological order so that only the archived changed record occurring nearest in time to said particular time is applied to said database.

6. An apparatus as recited in claim 5, wherein the database is relational.

7. An apparatus as recited in claim 5, including a disk for storing the database.

8. An apparatus as recited in claim 5, including a computer to recover the database by applying the archived one or more changed records in the database since said particular time so that only the archived changed record occurring nearest in time to said particular time as applied to said particular record in said database.

9. The apparatus as recited in claim 5, wherein said means for archiving one or more changed records in the database since said particular time further comprises a means for storing said one or more changed records in a direct access storage device,
  wherein said means for sorting said one or more changed records further comprises:
    means for creating a two column array in said direct access storage device, wherein each row of said two column array corresponds to one of said one or more changed records stored in said direct access storage device, wherein a particular row contains an address and a length of a particular corresponding changed record; and
    means for organizing said created two column array into said reverse chronological order,
  wherein said means for archiving said sorted one or more changed records onto said tape storage device further comprises:
    means for transferring said one or more changed records from said direct access storage device to said tape storage device in accordance with said created two column array organized in said reverse chronological order.

* * * * *